(12) United States Patent
Niitani

(10) Patent No.: US 8,247,498 B2
(45) Date of Patent: Aug. 21, 2012

(54) STAR POLYMER AND METHOD FOR PRODUCING THE SAME

(75) Inventor: Takeshi Niitani, Ichihara (JP)

(73) Assignee: Nippon Soda Co., Ltd., Tokyo (JP)

( * ) Notice: Subject to any disclaimer, the term of this patent is extended or adjusted under 35 U.S.C. 154(b) by 585 days.

(21) Appl. No.: 12/308,465

(22) PCT Filed: Jul. 11, 2007

(86) PCT No.: PCT/JP2007/063828
§ 371 (c)(1),
(2), (4) Date: Jan. 9, 2009

(87) PCT Pub. No.: WO2008/007709
PCT Pub. Date: Jan. 17, 2008

(65) Prior Publication Data
US 2010/0099819 A1    Apr. 22, 2010

(30) Foreign Application Priority Data

Jul. 11, 2006 (JP) ................................. 2006-190988

(51) Int. Cl.
C08F 293/00 (2006.01)
(52) U.S. Cl. ........ 525/242; 525/244; 525/245; 525/302; 525/308; 525/330.3; 525/333.3; 525/342; 525/383; 525/385; 525/267; 525/271
(58) Field of Classification Search .................. 525/242, 525/244, 245, 267, 271, 302, 308, 330.3, 525/333.3, 342, 383, 385
See application file for complete search history.

(56) References Cited

U.S. PATENT DOCUMENTS

| 2002/0188080 | A1 | 12/2002 | Nakagawa |
| 2008/0214685 | A1* | 9/2008 | Niitani et al. ................... 521/27 |
| 2009/0118436 | A1 | 5/2009 | Niitani |

FOREIGN PATENT DOCUMENTS

| EP | 1 780 224 A1 | 5/2007 |
| JP | A-06-219966 | 8/1994 |
| JP | A-10-195152 | 7/1998 |
| JP | A-11-116606 | 4/1999 |
| JP | A-2002-020479 | 1/2002 |
| JP | A-2002-540234 | 11/2002 |
| JP | A-2004-256563 | 9/2004 |
| JP | A-2005-154497 | 6/2005 |
| JP | A-2007-220376 | 8/2007 |
| WO | WO 00/12636 A1 | 3/2000 |
| WO | WO 2006/016665 A1 * | 2/2006 |
| WO | WO 2007/029794 A1 | 3/2007 |

OTHER PUBLICATIONS

Gnanou et al., "Synthesis of star-shaped poly(ethylene oxide)," *Makromol. Chem.*, 1988, vol. 189, pp. 2885-2892.
Kilian et al., "Synthesis and Cleavage of Core-Labile Poly (Alkyl Methacrylate) Star Polymers," *Journal of Polymer Science*, 2003, Part A: Polymer Chemistry, vol. 41, pp. 3083-3098.
Erdogan et al., "Facile Synthesis of AB$_2$-Type Miktoarm Star Polymers through the Combination of Atom Transfer Radical Polymerization and Ring-Opening Polymerization," *Journal of Polymer Science: Part A: Polymer Chemistry*, 2004, vol. 42, pp. 2313-2320.
Nasser-Eddine et al., "Synthesis of Polystyrene-Poly(*tert*-butyl methacrylate)-Poly(ethylene oxide) Triarm Star Block Copolymers," *Journal of Polymer Science: Part A: Polymer Chemistry*, 2004, vol. 42, pp. 1745-1751.
Supplementary European Search Report in European Patent Application No. 07790632.9; dated Sep. 9, 2010.
Kilian et al., "Synthesis and Cleavage of Core-Labile Poly (Alkyl Methacrylate) Star Polymers," *Journal of Polymer Science*, 2003, Part A: Polymer Chemistry, vol. 41, pp. 3083-3093.
Leon et al., "Isophthalate Ester-Terminated Dendrimers: Versatile Nanoscopic Building Blocks with Readily Modifiable Surface Functionalities," *Journal of American Chemical Society*, 1996, 118, pp. 8847-8859.

(Continued)

*Primary Examiner* — Roberto Rabago
(74) *Attorney, Agent, or Firm* — Oliff & Berridge, PLC

(57) ABSTRACT

It is to provide a narrowly dispersible star polymer having a controlled molecular structure and a method for easily producing such star polymer. The method comprises step (A) wherein arm (I) is formed by binding the anionic end of a polymer having an anionic end to a core and step (B) wherein arm (II) is extended from the core by a living radical polymerization. Examples of the star polymer is specifically exemplified by star polymers characterized by having a structure represented by formula (I-1) or (I-2) (In formula (I-1) or (I-2), B, $C_1$ and $C_2$ each independently represents a group composed of a polymer; and $m_1$ and $m_2$ each independently represents an integer of 1 or 2, wherein when $m_1$ or $m_2$ is 2, both $C_1$ or both $C_2$ represent the same group or different groups).

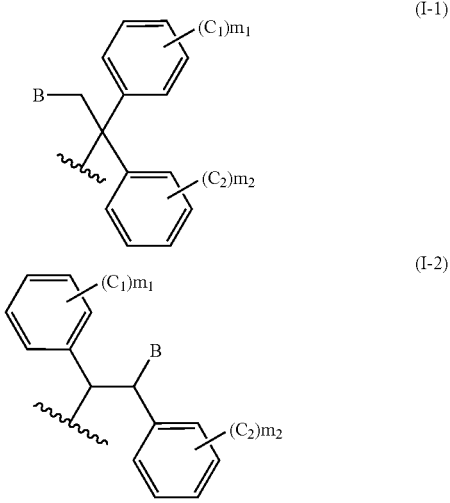

2 Claims, No Drawings

OTHER PUBLICATIONS

Leon et al., "Isophthalate Ester-Terminated Dendrimers: Versatile Nanoscopic Building Blocks with Readily Modifiable Surface Functionalities," J. Am. Chem. Soc., vol. 118, pp. 8847-8859, 1996.

Angot et al., "Amphiphilic Stars and Dendrimer-Like Architectures Based on Poly(Ethylene Oxide) and Polystyrene," Macromolecules, vol. 33, pp. 5418-5426, 2000.

Hadjichristidis et al., "Polymers with Complex Architecture by Living Anionic Polymerization," Chem. Rev., vol. 101, pp. 3747-3792, 2001.

Beil et al., "Synthesis of Nanosized "Cored" Star Polymers," Macromolecules, vol. 37, pp. 778-787, 2004.

Jankova et al., "Star Polymers by ATRP of Styrene and Acrylates Employing Multifunctional Initiators," J. of Polymer Science: Part A: Polymer Chemistry, vol. 43, pp. 3748-3759, 2005.

Zhao et al., "Synthesis of Well-Defined Star Polymers and Star Block Copolymers from Dendrimer Initiators by Atom Transfer Radical Polymerization," Polymer, vol. 46, pp. 5808-5819, 2005.

Francis et al., "Synthesis and Surface Properties of Amphiphilic Star-Shaped and Dendrimer-like Copolymers Based on Polystyrene Core and Poly(ethylene oxide) Corona," Macromolecules, vol. 36, pp. 8253-8259, 2003.

Knauss et al., "$((PS)_n PS)_m$ Star-Shaped Polystyrene with Star-Shaped Branches at the Terminal Chain Ends by Convergent Living Anionic Polymerization," Macromolecules, vol. 36, pp. 6036-6042, 2003.

Gauthier et al., "Arborescent Graft Copolymers: Highly Branched Macromolecules with a Core-Shell Morphology," Macromolecules, vol. 29, pp. 519-527, 1996.

Ilirao et al., "Synthesis of Well-Defined Functionalized Polymers and Star Branched Polymers by Means of Living Anionic Polymerization using Specially Designed 1,1-diphenylethylene Derivatives," Macromol. Rapid Commun., vol. 21, pp. 1171-1184, 2000.

Nov. 7, 2006 International Search Report and Written Opinion issued in International Application No. PCT/JP2006/317793.

Jan. 26, 2010 Korean Office Action issued in Korean Application No. 2008-7005411 with English-language translation.

May 28, 2010 Supplementary European Search Report issued in European Application No. 06797650.6.

Mar. 21, 2011 European Search Report issued in European Application No. 10014901.2.

Dec. 22, 2010 Office Action issued in U.S. Appl. No. 11/991,595.

Jun. 10, 2011 Office Action issued in U.S. Appl. No. 11/991,595.

* cited by examiner

STAR POLYMER AND METHOD FOR PRODUCING THE SAME

TECHNICAL FIELD

The present invention relates to a novel star polymer and a method for producing the same. The present invention specifically relates to a novel star polymer having heteroarms on the core and to a method for producing the star polymer.

BACKGROUND ART

Conventionally, methods such as the followings are known as production method for a star polymer having plural arms.
(a) A method wherein an AB-form block copolymer and an ABA-form block copolymer that present different properties such as regarding amphipathicity are subjected to micellation in a solvent, which are then directly cross-linked or their internal cores are cross-linked by some means (see for example, Patent Reference 1).
(b) A method wherein arms are formed from the core compound by a polymer polymerization process such as a living polymerization process (see for example, Non-patent Reference 1).
(c) A method wherein a dendrimer having a plurality of multiply branched chains is used (see for example, Patent Reference 2).

However, the method (a) in which block copolymers are used requires the micelle formation at the critical micelle concentration (CMC). Moreover, it is sometimes hard to form the micelle per se depending on the constitutional ratio of the polymers, and it is sometimes hard to establish an internal cross-linkage even when the micelle has been formed. As to the method (b) in which arms are formed from the core compound by a polymerization process, advanced polymerization techniques and a polymerization facility are required. As to the method (c) in which a dendrimer is used, it also requires advanced synthesis technique similarly as for the method (b) in spite that the dendrimer for use is a compound superior for its multiply branched property.

On the other hand, it is reported that a star-structured polymer which is obtained by the method comprising: subjecting methylmethacrylate, isobutylmethacrylate and t-butylmethacrylate to a polymerization by using diphenylhexyllithium as a polymerization initiator, wherein the diphenylhexyllithium is obtained by reacting 1,1-diphenylethylene and sec-butyllithium; and allowing the resultant to react with dicumylalcohol dimethacrylate or 2,5-dimethyl-2,5-hexandiordimethacrylate to obtain a star-structured polymer (see Non-patent Reference 2). However, star polymers obtained by conventional production methods including the above-mentioned method have a molecular weight distribution of 1.5 or more and it was difficult to form star polymers having uniform arms.

As a method for producing a hetero-armed star polymer, the method for forming a hetero-armed star copolymer is proposed which comprises the following steps: providing a first polymer having a first radically transferable atom or group; adding a coupling compound containing one or more α,α-disubstituted olefin group to the first polymer in the presence of a transition metal complex capable of undergoing a redox reaction with the first radically transferable atom or group; resulting in the addition of the coupling compound containing the α,α-disubstituted olefin group at the site of the first radically transferable atom or group and an elimination reaction comprising the radically transferable atom or group to form a reactive double bond; and allowing a second polymer having a second radically transferable atom or group in the presence of the transition metal complex to add to the reactive double bond. In this method, the first polymer and the second polymer are different from each other for at least either the molecular weight or the constitutional ratio (see Patent Reference 3).

However, the above method for producing a hetero-armed star polymer has drawbacks in that it sometimes causes a low yield and a wide molecular weight distribution, and that it is also difficult to obtain a polymer with the molecular weight as designed.

Patent Reference 1: Japanese Laid-Open Patent Application No. 10-195152
Patent Reference 2: Japanese Laid-Open Patent Application No. 6-219966
Patent Reference 3: Published Japanese translation of PCT International Publication No. 2002-540234
Non-patent Reference 1: Macromol. Chem., 189, 2885-2889 (1988)
Non-patent Reference 2: J. Polymer Science, Part A, 2003, 3083

DISCLOSURE OF THE INVENTION

Object to be Solved by the Invention

The object of the present invention is to provide a method for producing a narrowly dispersible star polymer having a controlled molecular structure and to provide a narrowly dispersible star polymer having a controlled molecular structure.

Means to Solve the Object

The present inventors have already proposed a narrowly dispersible star polymer with controlled molecular structure which is obtained by allowing a core compound having at least 2 ester groups to react with a polymer which has an anionic polymerization active end developing into an arm (Japanese Patent Application No. 2005-379857). The present inventors further made a keen study on narrowly dispersible star polymers with controlled molecular structure and found out that a narrowly dispersible star polymer having heteroarms on the core part can be produced. The present invention is thus completed.

Specifically, the present invention relates to: (1) a method for producing a star polymer consisting of a core and arms, comprising following steps: (A) forming arm (I) by binding the anionic end of a polymer having an anionic end to the core; and (B) extending arm (II) from the core by a living radical polymerization; (2) the method for producing a star polymer according to (1), wherein step (A) of forming arm (I) by binding the anionic end of the polymer having an anionic end to the core is conducted prior to step (B) of extending arm (II) from the core by a living radical polymerization; (3) the method for producing a star polymer according to (1) or (2), wherein the anionic end of the polymer having an anionic end is a polyfunctional end; (4) the method for producing a star polymer according to (3), wherein a functional group on the polyfunctional end is either a functional group that can become a living radical polymerization initiator or a functional group convertible into the functional group that can become a living radical polymerization initiator; (5) a star polymer comprising the structure represented by formula (I-1) or (I-2):

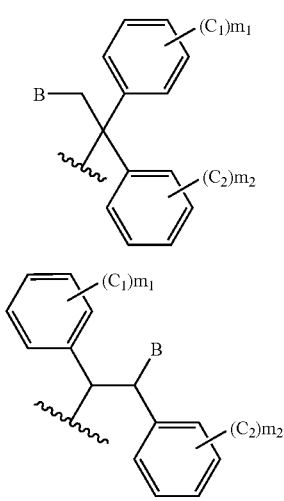

(I-1)

(I-2)

(In formula (I-1) or (I-2), B, $C_1$ and $C_2$ each independently represents a group consisted of a polymer; and $m_1$ and $m_2$ each independently represents an integer of 1 or 2, wherein when $m_1$ or $m_2$ is 2, both $C_1$ or both $C_2$ represent the same group or different groups. Wavy lined parts indicate that the parts are binding to the core skeleton); (6) the star polymer according to (5), wherein the core skeleton comprises an aromatic ring; (7) the star polymer according to (6), wherein the aromatic ring is an unsubstituted or substituted monocyclic aromatic hydrocarbon group, or an unsubstituted or substituted condensed aromatic hydrocarbon group; (8) the star polymer according to (5), wherein the core skeleton comprises a structure represented by formula (II):

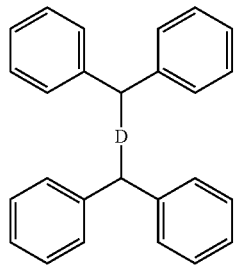

(II)

(In formula (II), D represents $(CH_2)_q$ or a p-phenylene group and q represents an integer of 0 to 3.); and (9) the star polymer according to any one of (5) to (8), wherein the ratio (Mw/Mn) of the weight average molecular weight (Mw) to the number average molecular weight (Mn) is from 1.01 to 1.20.

BEST MODE OF CARRYING OUT THE INVENTION

1) Method for Producing a Star Polymer

The method for producing a star polymer according to the present invention is not particularly limited as long as the method comprises:
(A) a step of forming arm (I) by binding the anionic end of a polymer having an anionic end to the core; and
(B) a step of extending arm (II) from the core by a living radical polymerization. Reactions in steps (A) and (B) may be conducted in no particular order, but it is preferred to conduct step (B) subsequent to step (A).

In the present invention, the phrase "the anionic end of a polymer having an anionic end" refers to an anionic end generated by a living anionic polymerization. When, however, step (A) is conducted prior to step (B), the anionic end means a polyfunctional anionic end to which a compound, having a functional group that can become the initiation site for a living radical polymerization, is bound. "A functional group that can become the initiation site for a living radical polymerization" herein includes a functional group convertible into such functional group.

In the present invention, "core" means a structure having a "core skeleton" that comprises a site to which a compound, having a functional group that can become the initiation site for a living radical polymerization, can be bound. When, however, step (B) is conducted prior to step (A), "core" then means a structure to which a compound having a functional group that can become the initiation site for a living radical polymerization is bound.

1-1) a Case in which Step (A) is Conducted Prior to Step (B)

As a specific example, a star polymer of the present invention is obtained by first allowing a polymer having an anionic polymerization active end to react with a compound represented by such as formulae (i-1) to (i-5) below:

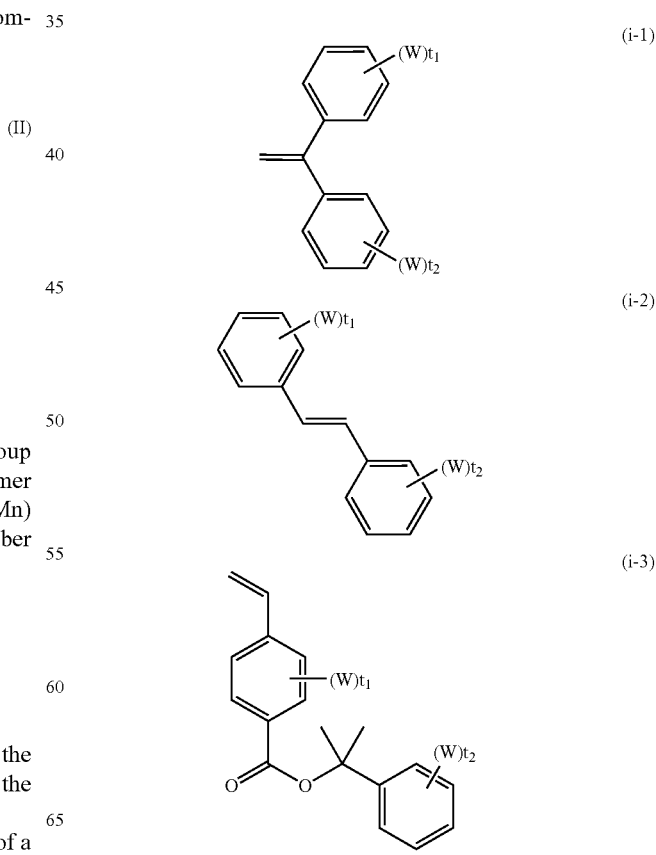

(i-1)

(i-2)

(i-3)

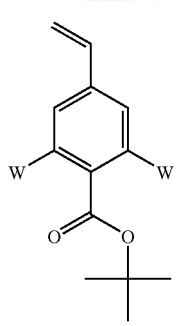

(i-4)

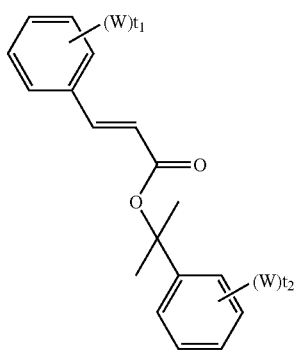

(i-5)

Then the reaction product is further reacted with a core compound, wherein W is converted into a polymerization initiator group as needed, and a polymeric monomer is polymerized by a living radical polymerization to obtain the star polymer.

In formulae (i-1) to (i-5), W is not particularly limited as long as each W is a functional group independent from each other and does not inhibit polymerization, and as long as each W is a group comprising a functional group that can become a polymerization initiation site such as a hydroxy group or halogen atom by converting a functional group as needed after the polymerization.

Specific examples of W include a silyloxyalkyl group such as a trimethylsilyloxymethyl group, 2-trimethylsilyloxyethyl group, t-butyldimethylsilyloxymethyl group and dimethylphenylsilyloxymethyl group; an aryloxyalkyl group such as a phenoxymethyl group and naphtoxymethyl group, an alkoxyalkyl group such as a t-butoxymethyl group, methoxymethyl group, ethoxymethyl group, 1-methoxyethoxymethyl group, 1-methoxymethoxymethyl group, 1-ethoxyethoxymethyl group, t-butoxycarbonyl group and tetrahydropyranyloxymethyl group. Among these, a silyloxyalkyl group is particularly preferred because the reaction can be conducted with ease. $t_1$ and $t_2$ each independently represents an integer of 1 or 2.

(Reaction of a Polymer Having an Anionic Polymerization Active End and a Compound Having a Functional Group that can Become the Initiation Site for a Living Radical Polymerization)

"A polymer having an anionic end" in step (A) is obtained by allowing a polymer having an anionic polymerization active end to react with a compound such as those represented by formulae (i-1) to (i-5). Arm (I) is formed on the core by this reaction.

Examples of a polymer having an anionic polymerization active end include a (meth) acrylic polymer and styrenic polymer. Because a narrowly dispersible star polymer can be obtained more reliably, a styrenic polymer is preferred and a polymer containing styrene is preferred.

A (meth)acrylic polymer and a styrenic polymer are detailed in the following.

Further, a polymer having an anionic polymerization active end can be produced by polymerizing a compound represented by formula (iii) below.

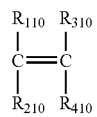

(iii)

In formula (iii), $R_{110}$-$R_{310}$ each independently represents a hydrogen atom or C1-C10 hydrocarbon group, and $R_{410}$ represents an aryl group or heteroaryl group.

In formula (iii), $R_{110}$ and $R_{310}$ each independently represents a hydrogen atom or a C1-C10 hydrocarbon group, where $R_{110}$ and $R_{310}$ may bind and form a ring. Examples of the C1-C10 hydrocarbon group include a methyl group, ethyl group, n-propyl group, isopropyl group, n-butyl group, sec-butyl group, isobutyl group, t-butyl group, phenyl group, naphthyl group and benzil group.

$R_{410}$ represents an aryl group or heteroaryl group, which is specifically exemplified by an aryl group such as a substituted or unsubstituted phenyl group, a substituted or unsubstituted naphtyl group, and a substituted or unsubstituted anthracenyl group; and a heteroaryl group such as a 2-pyridyl group and 4-pyridyl group. An aryl group is preferred among these in view of reactivity, where particularly preferred are a phenyl group, p-(1-ethoxyethoxy)phenyl group and p-tert-butoxyphenyl group.

$R_{110}$-$R_{410}$ may have a substituent on an appropriate carbon atom. Examples of the substituent include a halogen atom such as a fluorine atom, chlorine atom and bromine atom; a hydrocarbon group such as a methyl group, ethyl group, n-propyl group, phenyl group, naphthyl group and benzyl group; an acyl group such as an acetyl group and benzoyl group; a cyano group; a nitro group; a hydrocarbonoxy group such as a methoxy group and phenoxy group; an alkylthio group such as a methylthio group; an alkylsulfinyl group such as a methylsulfinyl group; an alkylsulfonyl group such as a methylsulfonyl group; an optionally substituted amino group such as an amino group and dimethylamino group; and an anilino group.

A polymerization reaction for synthesizing a polymer having an anionic polymerization active end can be conducted by either a method of adding dropwise an anionic polymerization initiator to a (mixed) monomer solution or a method of adding dropwise a (mixed) monomer solution to a solution containing an anionic polymerization initiator, but the method of adding dropwise a (mixed) monomer solution to a solution containing an anionic polymerization initiator is preferred in that the molecular weight and the molecular weight distribution can be controlled.

The polymer having an anionic polymerization active end produced as above is added with a compound represented by such as formula (i-1), which is then maturated and reacted with a polymer having an anionic polymerization active end. The maturation period is not particularly limited as long as the period allows the compound represented by such as formula (i-1) to sufficiently react with the polymer having an anionic polymerization active end. For example, a period of about 10 to 120 min is preferred and approximately 15 to 60 min is more preferred.

The above reaction for polymerization or maturation is usually conducted under an atmosphere of an inert gas such as nitrogen or argon in an organic solvent at a temperature within a range from −100 to 50° C., preferably from −50 to 30° C.

Examples of the anionic polymerization initiator include an alkali metal and organic alkali metal. Examples of the alkali metal include lithium, sodium, potassium and cesium. Examples of the organic alkali metal include alkylated, allylated and arylated compounds of the alkali metals. Specific examples thereof include ethyllithium, n-butyllithium, sec-butyllithium, tert-butyllithium, ethylsodium, lithiumbiphenyl, lithiumnaphthalene, lithiumtriphenyl, sodium naphthalene, α-methylstyrene sodium dianion, 1,1-diphenylhexyllithium and 1,1-diphenyl-3-methylpentyllithium.

Examples of the organic solvent include organic solvents which are usually used in the anionic polymerization, such as aliphatic hydrocarbons such as n-hexane and n-heptane; alicyclic hydrocarbons such as cyclohexane and cyclopentane; aromatic hydrocarbons such as benzene and toluene; ethers such as diethylether, tetrahydrofuran (THF) and dioxane; anisole, and hexamethylphosphoramide. These organic solvents may be used alone or as a mixed solvent comprising at least two kinds thereof. Among these organic solvents, a mixed solvent of tetrahydrofuran and toluene, a mixed solvent of tetrahydrofuran and hexane, and a mixed solvent of tetrahydrofuran and methylcyclohexane are preferably exemplified in view of polarity and solubility.

Examples of the polymerization form include a polymer consisting of a single component (monomer) and a copolymer consisting of 2 or more components (monomers). Examples of the copolymer include a random copolymer in which each component is statistically distributed in the entire copolymer chain, partial block copolymer, and complete block copolymer. These copolymers can be synthesized by selecting the method of adding monomers to be used.

(Step (A))

Examples of a core compound to which the anionic end of a polymer having an anionic end include a chained- or cyclic-aliphatic compound, aromatic compound and heterocyclic compound, where it is preferred that the core compound comprises an aromatic ring on its skeleton.

A compound represented by formula (Iv) below is preferably exemplified as a core compound.

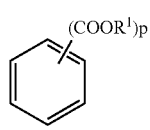

(iv)

A compound represented by formula (v) below is also preferably exemplified as a core compound.

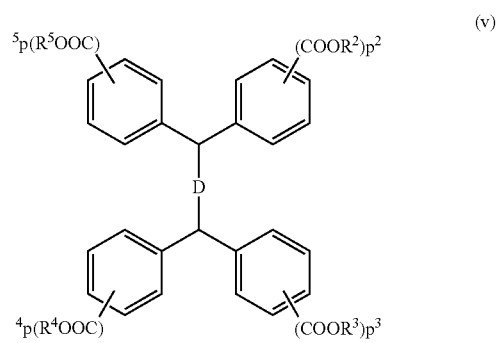

(v)

In formula (Iv), $R^1$ represents a C1-C6 alkyl group and the examples include a methyl group, ethyl group, n-propyl group, isopropyl group, n-butyl group, t-butyl group, n-pentyl group and n-hexyl group. p represents an integer of 1 to 6 and an integer of 2 to 4 is preferred. Further, in formula (v), $R^2$-$R^5$ each independently represents a C1-C6 alkyl group and is specifically exemplified by the above groups. $p^2$-$p^5$ each independently represents an integer of 1 to 5, where an integer of 1 and 2 is preferred. D represents ($CH_2$) or a p-phenylene group and q represents an integer of 0 to 3.

The reaction of the anionic end of a polymer having an anionic end and the core compound can be conducted by conducting a synthetic reaction of the polymer having an anionic end, and after the reaction is completed, by adding the core compound to the reaction solution. Further, the synthesized polymer having an anionic end may be added to the core compound solution. This reaction can be conducted under an atmosphere of an inert gas such as nitrogen or argon in an organic solvent at a temperature within a range from −100 to 50° C. preferably from −70 to 30° C. Further, the reaction can be conducted continuously in the solvent used for forming the polymer having an anionic end, or a different solvent can be added, or the solvent can be replaced with a different solvent. As the different solvent, a solvent similar to that used for a synthetic reaction of the polymer having an anionic end can be used.

In the method for producing a star polymer according to the present invention, a polymer having an anionic end and a core compound may be added at a ratio calculated in advance to make the amount of the reaction site of the polymer having an anionic end to be the double amount of the reaction site of the core compound. Also they may be added at a ratio wherein the amount of the reaction site of the polymer having an anionic end exceeds the double amount of the reaction site of the core compound.

(Step (B))

A method for newly extending arm (II) from a core is not particularly limited as long as arm (II) can be extended from the core. However, it is preferred to extend arm (II) by a living radical polymerization from a functional group present at the anionic end of a polymer having an anionic end, or from a functional group that can be converted into the functional group. When, for example, arm (I) is obtained by the reaction of a polymer having an anionic polymerization active end and a compound of formula (i-1), firstly, W is converted into a polymerization initiator group. The polymerization initiator group is exemplified by groups and the like such as a hydroxy group, halogen atom, or a group represented by the following formula:

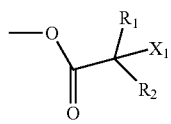

(wherein $X_1$ represents a halogen atom, $R_1$ and $R_2$ each independently represents a hydrogen atom, halogen atom, a C1-C6 alkyl group or phenyl group. Note that $R_1$ and $R_2$ do not represent a halogen atom at the same time.)

Arm (II) can be obtained by converting W into a polymerization initiator group and then by polymerizing a polymeric monomer. As a specific example, arm (II) can be obtained by converting W into a group containing a hydroxy group, and then polymerizing a cyclic compound by such as a ring-opening living polymerization. The cyclic compound is not particularly limited as long as it is a compound capable of undergoing a ring-opening polymerization, and the examples include a cyclic ether, cyclic thioether, cyclic ester (lactone), cyclic amide (lactam), cyclic anhydride, N-carboxy anhydride, cyclic imine, cyclic siloxane, and cyclic carbonate. Specific examples include ethylene oxide, propylene oxide, tetrahydrofuran, furan, 2-methyltetrahydrofuran, dibenzofuran, tetrahydrothiophene, propiolactone (β-lactone), butyrolactone (γ-lactone), δ-valerolactone (δ-lactone), butyrolactone, ε-caprolactone, β-propiolactam, γ-butyrolactam (2-pyrolidone), δ-valerolactam (2-piperidone), γ-lactam, ε-caprolactam, β-propiolactam, N-carboxy-α-amino acid anhydride (NCA), hexamethylcyclotrisiloxane, and trimethylene carbonate.

Further, arm (II) can be obtained by first converting W into a halogen atom, or into a group comprising the below compound:

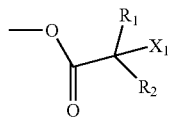

(wherein $X_1$ represents a halogen atom, $R_1$ and $R_2$ each independently represents a hydrogen atom, halogen atom, a C1-C6 alkyl group or phenyl group. Note that $R_1$ and $R_2$ do not represent a halogen atom at the same time.)

Then by polymerizing (meth)acrylic ester by such as a living radical polymerization. (Meth)acrylic ester is exemplified by an acrylic ester compound and a methacrylic ester compound referred to below.

Further, arm (II) can be obtained by first converting W into a halogen atom, or into a group comprising the following compound:

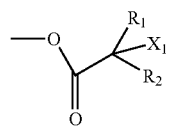

(wherein $X_1$ represents a halogen atom, $R_1$ and $R_2$ each independently represents a hydrogen atom, halogen atom, a C1-C6 alkyl group or phenyl group. Note that $R_1$ and $R_2$ do not represent a halogen atom at the same time.)

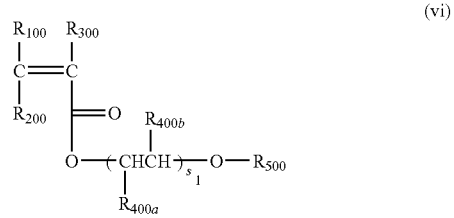

Then by polymerizing a compound represented by formula (vi) by such as a living radical polymerization.

Still further, arm (II) can be obtained by subjecting a compound represented by formula (vi) or a compound represented by the above formula (iii) to a block polymerization or a random polymerization by such as a living radical polymerization.

In formula (vi), $R_{100}$-$R_{300}$ each independently represents a hydrogen atom or a C1-C10 hydrocarbon group, where $R_{100}$ and $R_{300}$ may bind and form a ring. $R_{400a}$ and $R_{400b}$ each independently represents a hydrogen atom or a methyl group. $R_{500}$ represents a hydrocarbon group, acyl group or silyl group. $s_1$ represents an integer of 1 to 100. When $s_1$ is 2 or more, groups represented by formula: —CH($R_{400a}$)—CH($R_{400b}$)—O— may be identical to or different from each other.

In formula (iii), $R_{110}$ and $R_{310}$ each independently represents a hydrogen atom or a C1-C10 hydrocarbon group, and $R_{110}$ and $R_{310}$ may bind and form a ring. $R_{210}$ represents a hydrogen atom, C1-C10 hydrocarbon group, hydroxy group, hydrocarbonoxy group, carboxyl group, acid anhydride group, amino group, ester group, or an organic group comprising at least one functional group selected from the group consisting of a hydroxy group, carboxyl group, epoxy group, acid anhydride group and amino group. $R_{410}$ represents an organic group comprising at least one functional group selected from the group consisting of a hydroxy group, carboxyl group, epoxy group, acid anhydride group and amino group. These are specifically the same as those described later for repeating unit (VI).

Following methods (a) and (b) are exemplified as a method for polymerizing (meth)acrylic ester, a compound represented by formula (vi), a compound represented by formula (iii) or the like by a living radical polymerization with a polymer having an anionic end in which the above W has been converted into a polymerization initiator group: (a) a living radical polymerization process wherein a polymerization reaction is conducted by using a polymer which has an anionic end comprising a polymerization initiator group as a polymerization initiator and a transition metal complex as a catalyst; and (b) a living radical polymerization process using a stabilized radical initiator. In view that the star polymer of the interest can be obtained with a higher efficiency, the living radical polymerization process (a) is preferred.

Preferred examples of a main metal constituting a transition metal complex for use in the living radical polymerization process (a) include elements in group 7 to 11 of the periodic system such as manganese, rhenium, iron, ruthenium, rhodium, nickel and copper (according to the periodic system described in "Kagaku Binran Kisohen I (Handbook of Chemistry I, Basic Edition), 4th edition" (1993)). Among these metals, ruthenium is preferred.

A ligand coordinated around these metals to form a complex is not particularly limited and the examples include a phosphorous ligand, halogen atom, carbon monoxide, hydrogen atom, hydrocarbon ligand, oxygen-containing ligand, other chalcogenides, and nitrogen-containing ligand. The transition metal complex may contain 2 or more kinds of these ligands.

Preferred examples of the transition metal complex include dichlorotris(triphenylphosphine)ruthenium, chloroindenylbis(triphenylphosphine)ruthenium, dihydrotetrakis(triphenylphosphine)ruthenium, chlorocyclopentadienylbis(triphenylphosphine)ruthenium, chloropentamethylcyclopentadienylbis(triphenylphosphine)ruthenium; dicarbonylcyclopentadienyl ruthenium(II) iodide, dicarbonylcyclopentadienyl iron(II)iodide, carbonylcyclopentadienyl nickel(II)iodide; and a tellurium complex such as (1-ethoxycarbonyl-1-methylethyl)methyltellurium, (1-cyano-1-methylethyl)methyltellurium, α-methylbenzilmethyltellurium, benzilmethyltellurium and methylbenzoyltellurium. These transition metal complexes may be used alone or in combination of 2 or more kinds thereof.

In a living radical polymerization, an activator promoting a radical polymerization by acting on the transition metal complex may be used in combination. Lewis acid and/or amines can be used as such activator.

There is no particular limitation to the kinds of Lewis acid and, for example, an aluminum Lewis acid, scandium Lewis acid, titanium Lewis acid, zirconium Lewis acid, tin Lewis acid and the like can be used. Amines are not particularly limited as long as it is a nitrogen-containing compound such as a secondary amine, tertiary amine, nitrogen-containing heteroaromatic compound, where secondary and tertiay amines are preferred. These Lewis acids and amines may be used either alone or in combination of 2 or more kinds. Lewis acids and/or amines are generally used in the amount of 1 to 10 moles, preferably 3 to 6 moles, relative to 1 mole of the transition metal complex.

In the method for producing arm (II) by the living radical polymerization process (a), the polymer having an anionic end which comprises a polymerization initiator group acts as a polymerization initiator.

In other words, the binding site of an active halogen atom in the polymerization initiator group of the polymer which has an anionic end comprising a polymerization initiator group becomes a polymerization active site by turning into a radical species by the function of the transition metal complex, to which site a polymeric monomer (a compound having a living-radical polymeric unsaturated binding) polymerizes.

Following is the examples of a method for forming arm (II) by a living radical polymerization process:
(1) a method for forming arm (II) consisting of a single polymer, the method comprising using a single kind of compound having a living-radical polymeric unsaturated binding;
(2) a method for forming arm (II) consisting of a random copolymer, the method comprising adding a plurality of compounds having a living-radical polymeric unsaturated binding at the same time to the reaction system;
(3) a method for forming arm (II) consisting of a block copolymer, the method comprising sequentially adding a plurality of compounds having a living-radical polymeric unsaturated binding to the reaction system; and
(4) a method for forming arm (II) consisting of a gradient copolymer, the method comprising modifying over time the relative proportion of a plurality of compounds having a living-radical polymeric unsaturated binding.

The polymerization process is not particularly limited and, for example, bulk polymerization, solution polymerization, suspension polymerization or emulsion polymerization may be employed, where solution polymerization is preferred.

When employing solution polymerization, the polymer which has an anionic end comprising a polymerization initiator group, a polymeric monomer, a transition metal complex, and if desired Lewis acid and/or amines, are mixed in an organic solvent, which is then stirred under heating to obtain arm (II).

The stabilized radical initiator for use in the living radical polymerization process (b) is exemplified by a mixture of a stabilized free radical compound and a radical polymerization initiator, or by various alkoxyamines.

As for number of the arms of a star polymer of the present invention, 2 to 6 arms can be formed per single ester group due to the fact that, when the reaction site of the core compound is an ester group, the anionic polymerization active end attacks each ester group once or twice.

Low molecular weight narrow distribution star polymers can be obtained according to the production method of the present invention. For example, star polymers can be obtained that have a number average molecular weight (Mn) of 1,000,000 or less and show the ratio of the weight average molecular weight (Mw) to the number average molecular weight (Mn) (Mw/Mn: Molecular weight distribution) of from 1.01 to 1.20, preferably from 1.01 to 1.10.

1-2) A Case in which Step (B) is Conducted Prior to Step (A)

Specifically, arm (I) can be formed for example as follows: binding a compound, which has a functional group that can become the initiation site for a living radical polymerization, to a compound that becomes a core; forming arm (II) by polymerizing polymeric monomers by a living radical polymerization; and binding the anionic end of a polymer having an anionic end to the core.

"A compound that becomes a core", "a compound which has a functional group that can become the initiation site for a living radical polymerization", "a method for forming arm (II)" and "a method for binding the anionic end of a polymer having an anionic end to the core" means the same meaning and the same methods as those referred to in the aforementioned "1-1)".

2) Star Polymers of the Present Invention

Examples of the star polymers, of the present invention include those polymers having a structure represented by formulae (I-1) to (I-5) below.

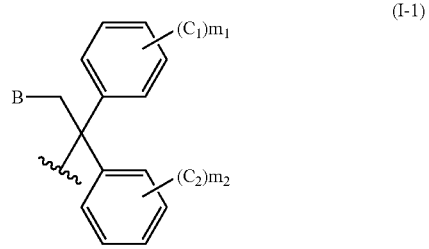

-continued

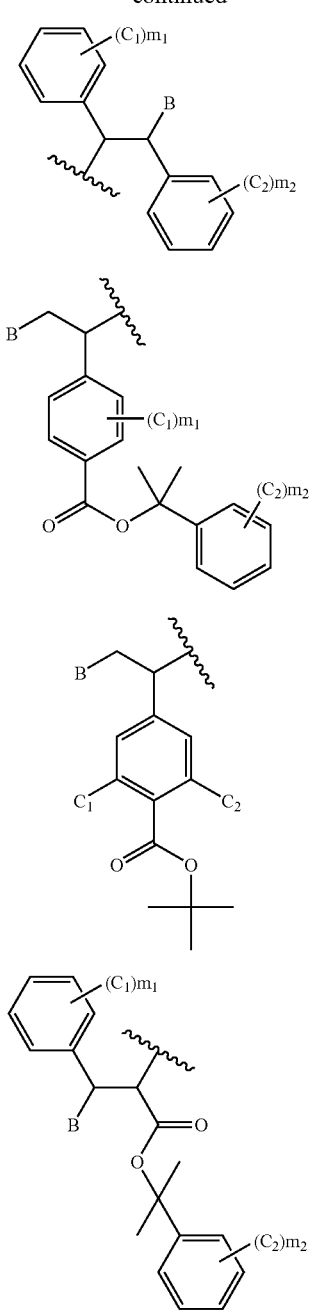

In formulae (I-1) to (I-5), B, $C_1$ and $C_2$ each independently represents a group composed of a polymer; and $m_1$ and $m_2$ each independently represents an integer of 1 or 2, wherein when $m_1$ or $m_2$ is 2, both $C_1$ or both $C_2$ represent the same group or different groups. The wavy lined parts indicate that the parts are binding to the core skeleton.

Examples of a polymer represented by B in formulae (I-1) to (I-5) include a (meth)acrylic polymer and styrenic polymer. Because a narrowly dispersible star polymer can be obtained more reliably, a styrenic polymer is preferred and it is more preferred that the polymer comprises a styrene polymer. When referring to "the polymer comprises a styrene polymer", it means a polymer consisting solely of a styrenic polymer, and a copolymer consisting of styrene and a styrene derivative.

Styrenic polymer is a polymer consisting of styrene and/or a styrene derivative, and it may be either a homopolymer or copolymer. Examples of the styrene derivative include an aryl compound such as o-methylstyrene, p-methylstyrene, p-t-butylstyrene, α-methylstyrene, p-t-butoxystyrene, m-t-butoxystyrene, p-(1-ethoxyethoxy), 2,4-dimethylstyrene, m-chlorostyrene, p-chlorostyrene, 4-carboxystyrene, vinylanisole, vinyl benzoate, vinylaniline, vinylnaphthalene and 9-vinylanthracene; a heteroaryl compound such as a 2-vinylpyridine, 4-vinylpyridine, 2-vinylquinoline, 4-vinylquinoline, 2-vinylthiophene and 4-vinylthiophene; methyl cinnamate; and the like. These styrene derivatives may be used by combining 2 or more kinds thereof. What are preferred among these are styrene, p-(1-ethoxyethoxy)styrene and p-tert-butylstyrene, where styrene is particularly preferred.

Further, a (meth)acrylic polymer is a polymer consisting of a (meth)acrylate or (meth)acrylic derivative. Examples of the (meth)acrylic derivative include an acrylic ester compound such as a methyl acrylate, ethyl acrylate, n-propyl acrylate, isopropyl acrylate, n-butyl acrylate, t-butyl acrylate, n-hexyl acrylate, cyclopentyl acrylate, cyclohexyl acrylate, phenyl acrylate and 2-pyridyl acrylate; and a methacrylic ester compound such as a methylmethacrylate, ethyl methacrylate, n-propyl methacrylate, isopropyl methacrylate, n-butyl methacrylate, t-butyl methacrylate, n-hexylmethacrylate, cyclopentyl methacrylate, cyclohexyl methacrylate, phenyl methacrylate and 2-pyridyl methacrylate;

2-methoxyethyl(meth)acrylate, 2-ethoxyethyl(meth)acrylate, 2-methoxypropyl(meth)acrylate, 2-ethoxypropyl(meth)acrylate, methoxypolyethyleneglycol (number of ethyleneglycol units is 2-100) (meth)acrylate, ethoxypolyethyleneglycol(meth)acrylate, phenoxypolyethyleneglycol(meth)acrylate, methoxypolypropyleneglycol (number of propyleneglycol units is 2-100) (meth)acrylate, ethoxypolypropyleneglycol(meth)acrylate, phenoxypolypropyleneglycol(meth)acrylate, polyethyleneglycol mono(meth)acrylate, 2-hydroxypropyl(meth)acrylate, polypropyleneglycol mono(meth)acrylate, polyethyleneglycol-polypropyleneglycol mono(meth)acrylate, octoxypolyethyleneglycol-polypropyleneglycol mono(meth)acrylate, lauroxypolyethyleneglycol mono(meth)acrylate, stearoxypolyethyleneglycol mono(meth)acrylate, "BLEMMER PME-Series; NOF CORPORATION", acetyloxypolyethyleneglycol (meth)acrylate, benzoyloxypolyethyleneglycol (meth)acrylate, trimethylsilyloxypolyethyleneglycol (meth)acrylate, t-butyldimethylsilyloxypolyethyleneglycol (meth)acrylate, methoxypolyethyleneglycol cyclohexene-1-carboxylate, methoxypolyethyleneglycol-sinnamate. These (meth)acrylic derivatives may be used by combining 2 or more kinds thereof.

The polymer represented by B is preferably a polymer having repeating unit (III) below.

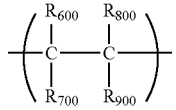

Repeating unit (III) may be a repeating structure of a single kind, or may be a block repeating structure or a random repeating structure of 2 or more kinds. Polymerization degree of repeating unit (III) is about 10-1,000, preferably about 30-150. A group containing repeating units preferably contains repeating units by 80% or more, more preferably by 90% or more. It is still more preferred that the group contains repeating units almost by 100%.

In repeating unit (III), $R_{600}$-$R_{800}$ each independently represents a hydrogen atom or a C1-C10 hydrocarbon group. Examples of the C1-C10 hydrocarbon group include a methyl group, ethyl group, n-propyl group, isopropyl group, n-butyl group, sec-butyl group, isobutyl group, t-butyl group, phenyl group, naphthyl group and benzil group. $R_{900}$ represents an aryl group or heteroaryl group, which is specifically exemplified by an aryl group such as a substituted or unsubstituted phenyl group, a substituted or unsubstituted naphtyl group, and a substituted or unsubstituted anthracenyl group; and a heteroaryl group such as a 2-pyridyl group and 4-pyridyl group. An aryl group is preferred among these in view of reactivity, where particularly preferred are a phenyl group, p-(1-ethoxyethoxy)phenyl group and p-tert-butoxyphenyl group.

$R_{600}$-$R_{900}$ may have a substituent on an appropriate carbon atom. Examples of such substituent include halogen atom such as a fluorine atom, chlorine atom and bromine atom; a hydrocarbon group such as a methyl group, ethyl group, n-propyl group, phenyl group, naphthyl group and benzyl group; an acyl group such as an acetyl group and benzoyl group; a cyano group; a nitro group; a hydrocarbonoxy group such as a methoxy group and phenoxy group; an alkylthio group such as methylthio group; an alkylsulfinyl group such as a methylsulfinyl group; an alkylsulfonyl group such as a methylsulfonyl group; an optionally substituted amino group such as an amino group and dimethylamino group; and an anilino group.

A polymer represented by $C_1$ or $C_2$ can be exemplified by the same polymer to that represented by the above-mentioned B, where a group having repeating unit (IV) below is preferred.

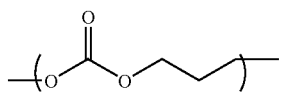

(IV)

Also preferred is a group having repeating unit (V) below.

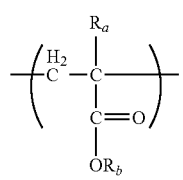

(V)

In formula (V), $R_a$ represents a hydrogen atom or C1-C6 alkyl group and $R_b$ represents an organic group. $R_a$ in formula (V) represents a hydrogen atom or C1-C6 alkyl group, where a methyl group is preferred as the C1-C6 alkyl group. $R_b$ represents an organic group such as a C1-C10 alkyl group. The repeating parts represented by formula (V) is specifically exemplified by a (meth) acrylic polymer referred to in the above. Polymerization degree of repeating units (IV) and (V) is about 10-1,000, preferably about 30-150. A group comprising repeating units preferably contains repeating units by 80% or more, more preferably by 90% or more. It is still more preferred that the group contains repeating units almost by 100%.

It is preferred that a polymer represented by $C_1$ and $C_2$ is a group comprising repeating unit (VI).

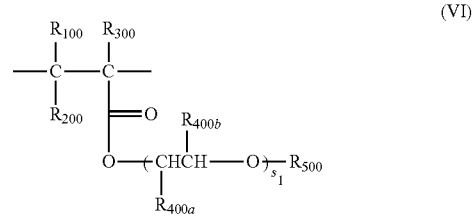

(VI)

A polymer represented by $C_1$ and $C_2$ may also be a group comprising a random repeating unit structure or a block repeating structure consisting of repeating units (VI) and (VII).

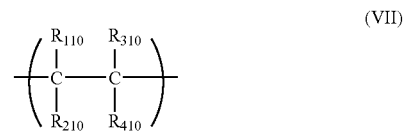

(VII)

By containing random repeating units, improved adhesive (bonding) strength, film strength, conductive property, solvent resistance (electrolyte resistance) and heat-shrink resistance can be achieved. Each repeating units (VI) and (VII) may be either a repeating unit of a single kind or a repeating unit of 2 or more kinds. Polymerization degree of a random repeating structure or a block repeating structure consisting of repeating unit (VI) alone or consisting of repeating units (VI) and (VII) is, for example, about 10-1,000, preferably about 30-150. A group containing repeating units preferably contains the repeating units by 80% or more, more preferably by 90% or more. It is still preferred that the group contains repeating units almost by 100%.

In repeating unit (VI), $R_{100}$-$R_{300}$ each independently represents a hydrogen atom or a C1-C10 hydrocarbon group, where $R_{100}$ and $R_{300}$ may bind and form a ring. Examples of the C1-C10 hydrocarbon group include a methyl group, ethyl group, n-propyl group, isopropyl group, n-butyl group, sec-butyl group, isobutyl group, t-butyl group, phenyl group, naphthyl group and benzyl group. $R_{400a}$ and $R_{400b}$ each independently represents a hydrogen atom or a methyl group.

$R_{500}$ represents a hydrocarbon group, acyl group or silyl group. Examples of the hydrocarbon group include a methyl group, ethyl group, n-propyl group, isopropyl group, n-butyl group, sec-butyl group, isobutyl group, t-butyl group, n-hexyl group, phenyl group, substituted phenyl group and naphthyl group. Examples of the acyl group include a formyl group, acetyl group, propionyl group and butyryl group. Examples of the silyl group include a trimethylsilyl group, t-butyldimethylsilyl group and dimethylphenylsilyl group.

Further, a hydrocarbon group of $R_{100}$-$R_{500}$ may contain a substituent on an appropriate carbon atom. Examples of the substituent include a halogen atom such as a fluorine atom, chlorine atom and bromine atom; a hydrocarbon group such as a methyl group, ethyl group, n-propyl group, phenyl group, naphthyl group and benzyl group; an acyl group such as an acetyl group and benzoyl group; a cyano group; a nitro group; a hydrocarbonoxy group such as a methoxy group and phenoxy group; an alkylthio group such as a methylthio group; an alkylsulfinyl group such as a methylsulfinyl group; an alkylsulfonyl group such as a methylsulfonyl group; an optionally substituted amino group such as an amino group and dimethylamino group; and an anilino group.

$s_1$ represents an integer of 1 to 100, where an integer of 2 to 50 is preferred. When $s_1$ is 2 or more, repeating units represented by formula: —CH($R_{400a}$)—CH($R_{400b}$)—O— may be identical to or different from each other.

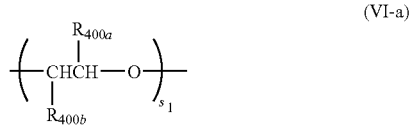

(VI-a)

Repeating unit (VI-a) above is contained preferably by 20 to 90% by weight, still more preferably 50 to 80% by weight, in the polymer constituting the arm. By containing repeating unit (VI-a) within the above percentage range, improved adhesive (bonding) strength, film strength, conductive property, solvent resistance (electrolyte resistance) and heat-shrink resistance can be achieved.

In repeating unit (VII), $R_{110}$ and $R_{310}$ each independently represents a hydrogen atom or a C1-C10 hydrocarbon group, where $R_{110}$ and $R_{310}$ may bind and form a ring. Examples of the C1-C10 hydrocarbon group include the same groups as those described for repeating unit (VI).

$R_{210}$ represents a hydrogen atom, C1-C10 hydrocarbon group, hydroxy group, hydrocarbonoxy group, carboxyl group, acid anhydride group, amino group, ester group, or an organic group comprising at least one functional group selected from the group consisting of a hydroxy group, carboxyl group, epoxy group, acid anhydride group and amino group. The C1-C10 hydrocarbon group is exemplified by the same groups as for repeating unit (VI). Examples of the hydrocarbonoxy group include a methoxy group, ethoxy group and phenoxy group. Examples of the acid anhydride group include a maleic anhydride group and phthalic anhydride group. $R_{410}$ represents an organic group comprising at least one functional group selected from the group consisting of a hydroxy group, carboxyl group, epoxy group, acid anhydride group and amino group.

$R_{110}$-$R_{410}$ may have a substituent on an appropriate carbon atom. Examples of the substituent include a halogen atom such as a fluorine atom, chlorine atom and bromine atom; a hydrocarbon group such as a methyl group, ethyl group, n-propyl group, phenyl group, naphthyl group and benzyl group; an acyl group such as an acetyl group and benzoyl group; a cyano group; a nitro group; a hydrocarbonoxy group such as a methoxy group and phenoxy group; an alkylthio group such as a methylthio group; an alkylsulfinyl group such as a methylsulfinyl group; an alkylsulfonyl group such as a methylsulfonyl group; an optionally substituted amino group such as an amino group and dimethylamino group; and an anilino group.

Repeating unit (VII) is specifically exemplified by repeating units (VII-1) to (VII-3), where repeating unit (VII-1) is particularly preferred.

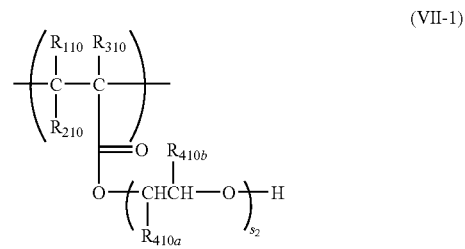

(VII-1)

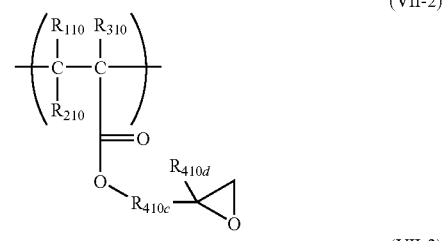

(VII-2)

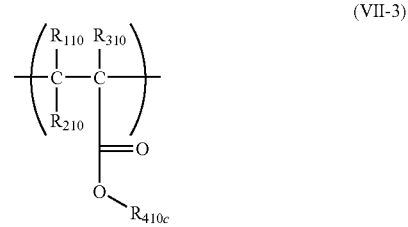

(VII-3)

In repeating unit (VII-1), $R_{410a}$ and $R_{410b}$ each independently represents a hydrogen atom or methyl group. $s_2$ represents an integer of 1 to 100, where an integer of 2 to 50 is preferred. When $s_2$ is 2 or more, repeating units represented by formula: —CH($R_{410a}$)—CH($R_{410b}$)—O— may be identical to or different from each other.

In repeating unit (VII-2), $R_{410b}$ represents a C1-C6 alkylene group, C6-C10 divalent aromatic hydrocarbon group, C3-C10 divalent alicyclic hydrocarbon group, or a divalent organic group composed of groups from among the above groups. $R_{410d}$ represents a hydrogen atom or a C1-C4 alkyl group and the specific examples thereof include a methyl group, ethyl group, n-propyl group, isopropyl group, n-butyl group, sec-butyl group, isobutyl group and t-butyl group. $R_{410d}$ may have a substituent on an appropriate carbon atom. Examples of the substituent include a halogen atom such as a fluorine atom, chlorine atom and bromine atom; a hydrocarbon group such as a methyl group, ethyl group, n-propyl group, phenyl group, naphthyl group and benzyl group; an acyl group such as an acetyl group and benzoyl group; a cyano group; a nitro group; a hydrocarbonoxy group such as a methoxy group and phenoxy group; an alkylthio group such as a methylthio group; an alkylsulfinyl group such as a methylsulfinyl group; an alkylsulfonyl group such as a methylsulfonyl group; an optionally substituted amino group such as an amino group and dimethylamino group; and an anilino group.

In repeating unit (VII-3), $R_{410e}$ represents a hydrogen atom or a group represented by —$R_{510}$—COOH. $R_{510}$ represents a C1-C6 alkylene group, C6-C10 divalent aromatic hydrocarbon group, C3-C10 divalent alicyclic hydrocarbon group, or a divalent organic group composed of groups among these groups.

When a polymer constituting the arm comprises repeating units (III), (VI) and (VII), it is preferred that the polymeric chain constituting the arm comprises repeating unit (III) by 10 to 50% by weight, repeating unit (VI) by 40 to 85% by weight, and repeating unit (VII) by to 15% by weight. It is more preferable that the polymeric chain constituting the arm comprises repeating unit (III) by 20 to 40% by weight, repeating unit (VI) by 55 to 75% by weight, and repeating unit (VII) by 5 to 15% by weight.

The number average molecular weight of a polymeric chain constituting an arm of a star polymer of the present invention relative to polystyrene standards as measured by gel permeation chromatography is not particularly limited, but is preferably within a range, for example, from 5,000 to 1,000,000. The ratio of the weight average molecular weight (Mw) to the number average molecular weight (Mn) (Mw/Mn: Molecular weight distribution) is preferably from 1.01 to 1.20, more preferably from 1.01 to 1.10.

(Core Skeleton)

The core skeleton of a star polymer of the present invention is not particularly limited as long as the skeleton enables the formation of a star polymer having a structure represented by formulae (I-1) to (I-5). Examples of the core skeleton include a chained- or cyclic aliphatic group, aromatic group and heterocyclic group, among which it is preferred that the skeleton comprises an aromatic ring. Still more preferred aromatic ring is an unsubstituted or substituted monocyclic aromatic hydrocarbon group, or an unsubstituted or substituted condensed aromatic hydrocarbon group. It is particularly preferred that an aromatic ring has the structure represented by the following structure.

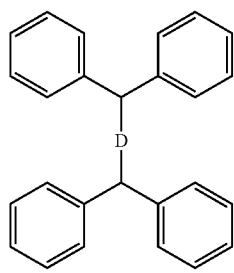

(II)

(In formula (II), D represents $(CH_2)_q$ or a p-phenylene group and q represents an integer of 0 to 3.)

As for other structures of the core skeleton, those described in J. Am. chem. Soc., Vol. 118, No. 37, 8847, 1996, and those shown below are exemplified.

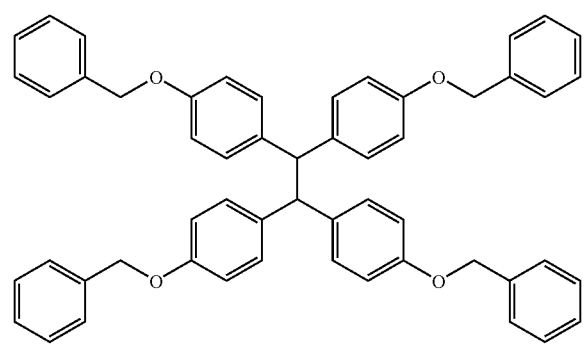

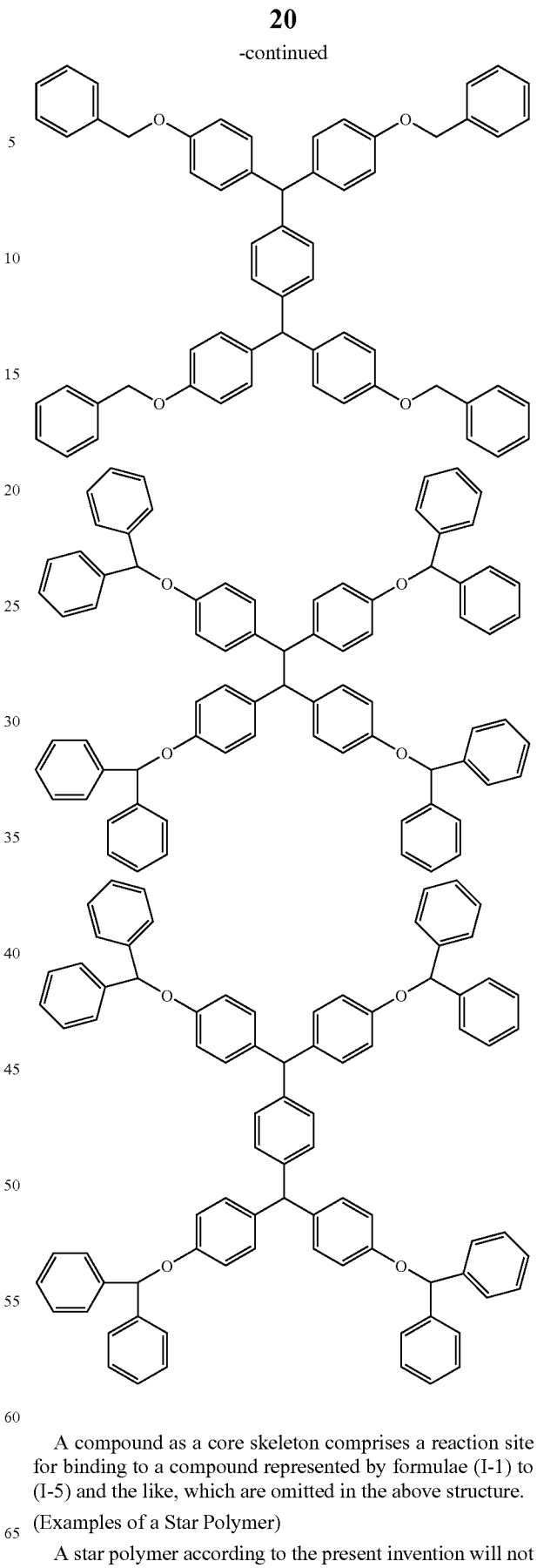

A compound as a core skeleton comprises a reaction site for binding to a compound represented by formulae (I-1) to (I-5) and the like, which are omitted in the above structure.

(Examples of a Star Polymer)

A star polymer according to the present invention will not be limited as long as it is a star polymer consisting of an arm and a core shown above and can be exemplified by those star polymers represented by formulae (VIII-1) and (VIII-2) below.

(VIII-1)

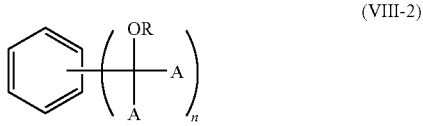
(VIII-2)

A star polymer of the present invention is also exemplified by those polymers represented by formulae (IX-1) and (IX-2) below.

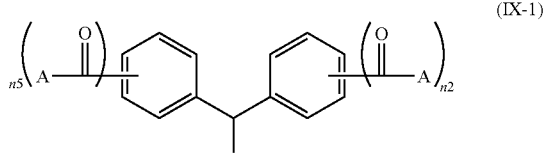
(IX-1)

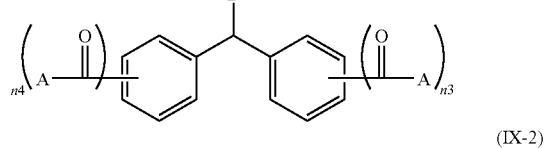

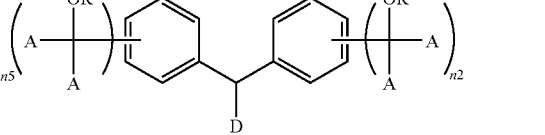
(IX-2)

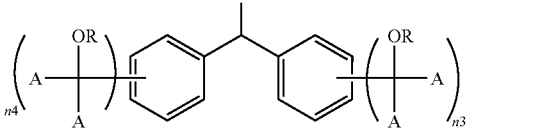

In formulae (VIII-1) and (VIII-2), A is exemplified by a structure represented by formulae (I-1) to (I-5), and n represents an integer of 1 to 6, where an integer of 2 to 4 is preferred. In formulae (IX-1) and (IX-2), A is exemplified by a structure represented by formula (I-1) or (I-2), and D represents $(CH_2)_q$ or a p-phenylene group, where q being 0 is particularly preferred. q represents an integer of 0 to 3, $n^2$-$n^5$ each represents an integer of 1 to 5, where an integer of 1 or 2 is preferred. In formulae above, R represents a hydrogen or a C1-C4 alkyl group.

(Component that can be Contained in a Star Polymer)

A star polymer of the present invention is a narrowly dispersible star polymer with controlled molecular structure and controlled molecular weight distribution, and is, for example, suitably used as an electrochemical material such as a battery, capacitor, sensor, condenser, EC element, photoelectric conversion element; an inclusion material; a functional material for such as an electrical appliance and industrial device.

A functional material using a star polymer of the present invention preferably contains a metal salt. A functional material containing a metal salt along with the star polymer successfully shows improved conductivity and a further improvement of the adhesive strength. The metal salt is not particularly limited but an electrolytic salt is preferred. Preferred electrolytic salts include an alkali metal salt, quaternary ammonium salt such as $(CH_3)_4NBF_6$, quaternary phosphonium salt such as $(CH_3)_4PBF_6$, transition metal salt such as $AgClO_4$, or a protic acid such as hydrochloric acid, perchloric acid and fluoroboric acid. What is preferred among these are an alkali metal salt, quaternary ammonium salt, quaternary phosphonium salt, or transition metal salt, and more preferred is alkali metal salt. Plural kinds of metal salts may be used in combination.

Specific examples of the alkali metal salt include, $LiCF_3SO_3$, $LiN(CF_3SO_2)_2$, $LiC(CF_3SO_2)_3$, $LiC(CH_3)(CF_3SO_2)_2$, $LiCH(CF_3SO_2)_2$, $LiCH_2(CF_3SO_2)$, $LiC_2F_5SO_3$, $LiN(C_2F_5SO_2)_2$, $LiB(CF_3SO_2)_2$, $LiPF_6$, $LiClO_4$, $LiI$, $LiBF_4$, $LiSCN$, $LiAsF_6$, $NaCF_3SO_3$, $NaPF_6$, $NaClO_4$, $NaI$, $NaBF_4$, $NaAsF_6$, $KCF_3SO_3$, $KPF_6$, $KI$, $LiCF_3CO_3$, $NaClO_3$, $NaSCN$, $KBF_4$, $Mg(ClO_4)_2$, and $Mg(BF_4)_2$, where lithium salt is particularly preferred.

A functional material using a star polymer of the present invention may contain a cross-linker, filler, radiosensitizer, storage stabilizer and the like. Examples of the cross-linker include a polyisocyanate compound comprising 2 or more isocyanate groups in the molecule, and a polyepoxy compound comprising 2 or more epoxy groups in the molecule. Examples of the radiosensitizer include urea, nitrile compound (N,N-disubstituted-p-aminobenzonitrile, etc.), phosphorus compound (tri-n-butylphosphine, etc.). Examples of the storage stabilizer include quaternary ammonium chloride, benzothiazol and hydroquinone.

An adhesive agent using a star polymer of the present invention has a strong adhesive force to a plastic such as an olefin resin, metal, inorganic compound, ceramic, and to the coating substrates thereof. The adhesive also has a high film strength as well as a high conductivity. Further, an adhesive of the present invention can be used in a solvent due to its superior solvent resistance. In view of these properties, an adhesive of the present invention can be preferably used for batteries irrespective of whether for a solid battery or for a liquid battery.

A bonding agent for use in the electrode production that employs a star polymer of the present invention can be used for retaining an electrode-activating substance on the surface of a collector substance. The bonding agent is superior in binding between electrode-activating substances and binding of an electrode-activating substance and a collector substance. In addition, the bonding agent has a high film strength as well as a high conductivity. A bonding agent of the present invention is also superior in respect of resistance to an electrolytic solution and can be preferably used for batteries irrespective of whether for a solid battery or for a liquid battery. Since the bonding agent does not shrink by heat, it shows sufficient resistance to the temperature elevation when a battery is in use.

A composition for a solid electrolyte wherein a star polymer of the present invention is used can be suitably used as a solid electrolyte layer of a solid electrolyte battery which comprises a positive electrode, a negative electrode, and a composition layer of a solid electrolyte. In other words, a polymeric solid electrolyte battery can be obtained by holding a solid electrolyte sheet between the positive electrode and the negative electrode. Further, a solid electrolyte of the present invention has a mechanical strength superior enough to enable formation of a self-supported film, and has a superior ion conductance over a wide temperature range. The solid electrolyte is also superior in solvent resistance and can be used by impregnating an electrolytic solution.

The present invention will now be described in detail by way of examples, but the technical scope of the present invention is not limited to these exemplifications.

Example 1

Synthesis of the 4armPSt Star Polymer

[Synthesis of an Arm]

109.0 g of anhydrous tetrahydrofuran (hereinafter abbreviated as THF) and 1044.3 g of anhydrous toluene were added in a nitrogen-substituted 2000 mL four-neck flask, and the reaction system was maintained at −40° C. while stirring. To the reaction system, 10.2 g (24 mmol) of a 1.6 mol/L n-butyllithium/hexan solution (hereinafter abbreviated as NBL) was added, and 5 min thereafter 207.7 g (2.0 mol) of styrene was added for conducting polymerization. 20 min after the completion of the dropwise addition, a sample was collected for gas chromatography (hereinafter abbreviated as GC) to confirm completion of the polymerization. To this solution, 11.3 g (24 mmol) of a diphenylethylene derivative compound represented by formula (I-1) (wherein W is m-t-butyldimethylsilyloxymethyl group). (m-OTBDMS) was added and then subjected to maturation for 30 min. Analysis of the polymer solution by using a gel filtration chromatography (hereinafter abbreviated as GPC) revealed that the polymer was a monomodal polymer with the molecular weight Mn of 9,400 and the dispersity Mw/Mn of 1.04.

(Star Shape Formation)

3.2 g (5.1 mmol) of 1,1,2,2-tetrakis-(4-ethoxycarbonylphenyl)ethane dissolved in 100 mL of anhydrous THF was added to the above-mentioned reaction system and the reaction was continued for 30 min, and then the reaction was terminated by methanol. This polymerization solution was added to a large amount of methanol to precipitate a polymer. The precipitated polymer was then filtered, washed, and dried under vacuum for 5 hours at 50° C. to obtain 222 g of white powdery polymer. Then, by removing excess amount of the arm polymer by a separating operation, white powdery star polymer (hereinafter abbreviated as 4PS-8OTBDMS) was obtained. GPC analysis revealed that the resulting polymer was a monomodal polymer having the molecular weight Mn of 30,600 and the dispersity Mw/Mn of 1.04. The molecular weight Mw was 38,100 as measured by a multi angle laser light scattering detector (hereinafter abbreviated as GPC-MALLS).

<Conversion to a Polymeric Initiator Group (Conversion of OTBDMS Group (t-butyldimethylsilyloxymethyl Group) to OBiB Group (bromoisobutyloiloxymethyl Group))>

To a nitrogen-substituted 2000 mL flask, 222 g of 4PS-8OTBDMS (5.8 mmol), 1000 mL of THF, and 485 mL of tetra-n-butylammonium fluoride (TBAF) (1.0 M in THF) were added and stirred overnight at room temperature. The solvent was reduced to half and the solution was added to a large amount of methanol to precipitate a polymer. The precipitated polymer was then filtered, washed, and dried under vacuum for 5 hours at 50° C. to obtain 210 g of white powdery polymer (hereinafter abbreviated as 4PS-8OH).

To a nitrogen-substituted 2000 mL flask, 210 g (6.0 mmol) of 4PS-8OH, 1000 mL of anhydrous THF, and 10.0 g (99 mmol) of triethylamine (TEA) were added, and the reaction system was maintained at 0° C. while stirring. 17.2 g (75 mmol) of bromoisobutyloilbromide was gradually added to the reaction system, and after the completion of the dropwise addition, the temperature was set back to room temperature and the reaction system was stirred overnight. After TEA bromate was removed by filtration, the solvent was reduced to half and the solution was added to a large amount of methanol to precipitate a polymer, which was then filtered and washed. The resultant polymer was separated and purified by using THF/MeOH and reprecipitated with a large amount of MeOH and dried under vacuum for 5 hours at 50° C. to obtain 120 g of white powdery polymer (hereinafter abbreviated as 4PS-8OBiB). GPC analysis of this polymer solution revealed that the resultant polymer was a monomodal polymer having the molecular weight Mn of 30,600 and the dispersity Mw/Mn of 1.04. The molecular weight Mw was 39,400 as measured by GPC-MALLS.

<Living Radical Polymerization>

2.0 g (0.05 mol) of 4PS-8OBiB, 7.9 g (7 mol) of methoxypolyethyleneglycolmonomethacrylate (NOF CORPORATION, BLEMMER PME-1000), and 30 g of toluene were put in a 100 mL flask, followed by deaeration. To the flask, 0.08 g (0.08 mmol) of dichlorotris(triphenylphosphine)ruthenium was added and dissolved uniformly, then 0.04 g (0.3 mmol) of di-n-butylamine was added, followed by heating to 80° C. to initiate a polymerization reaction. 7 hours after the polymerization reaction was initiated, the reaction was terminated by cooling the reaction solution to 0° C. The reaction solution was applied to a column to remove the metal complex and unreacted monomers. The solvent was concentrated under reduced pressure, and the obtained tenacious residue was dried under reduced pressure for 5 hours at 60° C. The molecular weight Mw and the dispersity Mw/Mn of the resultant polymer as measured by GPC-MALLS were 144,000 and 1.09, respectively.

INDUSTRIAL APPLICABILITY

According to the present invention, a narrowly dispersible star polymer with controlled molecular structure can be provided. Star polymers of the present invention can be suitably used as an electrochemical material such as a battery, capacitor, sensor, condenser, EC element, photoelectric conversion element; an inclusion material; a functional material for such as an electrical appliance and industrial device. Further, owing to its specific three-dimensional structure and very narrow molecular distribution, the star polymers of the present invention are expected to have a unique physicochemical property and can be applied to various fields including coating, drug delivery system, supermolecular chemistry and nanotechnology. In the field of electric and optical function, star polymers of the present invention can be applied to a lithographic material, patterning material and resist material, since the star polymers can contain only desired length of both hydrophilic portion and hydrophobic portion on the arms so that the obtained phase-separated substance can have a controlled domain size. Further, because star polymers of the present invention themselves are nano particles, they can be made into, other than those enumerated above, such as a nanocomposite with a functional nano particle including a fluorescent substance, semiconductor and metal, as well as into the nanocomposite thin film. Moreover, the star polymers can be applied to such as a memory material, sensor, thin-film material for various display elements, and various surface finishing agents. In the field of biotechnology, star polymers of the present invention can be applied to such as a sustained release carrier, capsulation of a drug, nanocarrier, and contrast agent for such as MRI, by utilizing the amphipathic property of both hydrophilic and hydrophobic properties of the arm. In the field of ink, paint and coating, star polymers of the present invention can be applied to a paint, resin for ink, and additive. Star polymers of the present invention further can be applied to an electrophotographic binder and transfer material, by utilizing the sharp melting property, and still further can be applied to such as an antistatic agent, antifouling agent, and a surface and interface improver, by utilizing the hydrophilic and hydrophobic properties. In the fields other than the above, star polymers of the present invention can be applied in common fields involving such as an organic and inorganic hybrid material, porous material with micropore control which has a star polymer as a template (adsorbent, catalytic carrier, gas-permeable film, filter), ultrathin film with controlled alignment which utilizes the hydrophilic and hydrophobic properties, and cosmetics. In particular, star polymers of the present invention that comprise a random repeat structure consisting of repeating units (VI) and (VII) on the arm are useful as a adhesive composition (adhesive agent), a bonding composition for use in the electrode production (a bonding agent for use in the electrode production), and a bonding composition for a solid electrolyte.

An adhesive using a star polymer of the present invention has a strong adhesive force to a plastic such as an olefin resin, metal, inorganic compound, ceramic, and the coating substrates thereof. The adhesive also has a high film strength as well as a high conductivity. Further, an adhesive of the present invention can be used in a solvent due to its superior solvent resistance. An adhesive of the present invention can be preferably used for batteries irrespective of whether for a solid battery or for a liquid battery.

A bonding agent for use in the electrode production employing a star polymer of the present invention can be used for retaining an electrode-activating substance on the surface of a collector substance, and is superior in binding electrode-activating substances and binding an electrode-activating substance and a collector substance. In addition, a bonding agent of the present invention has a high film strength as well as a high conductivity. The bonding agent is also superior in the resistance to an electrolytic solution and can be preferably used for both of a solid battery and a liquid battery. Since the bonding agent does not shrink by heat, it shows sufficient resistance to the temperature elevation when a battery is in use.

A composition for a solid electrolyte wherein a star polymer of the present invention is used can be suitably used as a solid electrolyte layer of a solid electrolyte battery comprising a positive electrode, a negative electrode, and a composition layer for a solid electrolyte. In other words, a polymeric solid electrolyte battery can be obtained by holding a solid electrolyte sheet between the positive electrode and the negative electrode. Further, a solid electrolyte of the present invention has a mechanical strength superior enough to enable the formation of a self-supported film, and has a superior ion conductance over a wide temperature range. The solid electrolyte is also superior in solvent resistance and can be used by impregnating an electrolytic solution.

The invention claimed is:

1. A star polymer comprising the structure represented by (VIII-1), (VIII-2), (IX-1), or (IX-2):

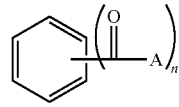

(VIII-1)

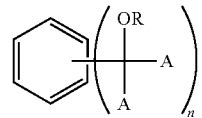

(VIII-2)

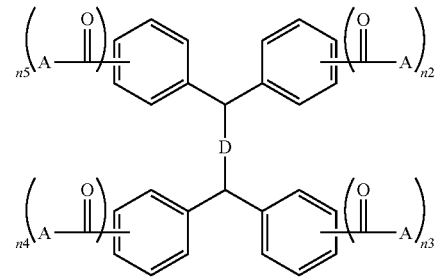

(IX-1)

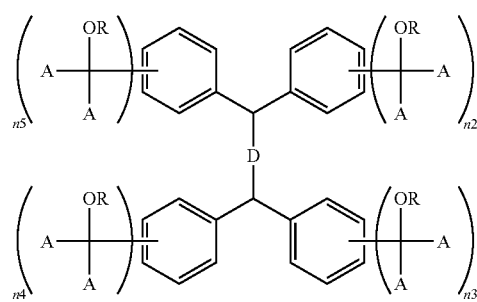

(IX-2)

where:

D represents $(CH_2)_q$ or a p-phenylene group and q represents an integer of from 0 to 3;

R represents a hydrogen or a C1 to C4 alkyl group;

n represents an integer of from 1 to 6;

n2, n3, n4, and n5 each represents an integer of from 1 to 5; and

A is formula (I-1) or (I-2):

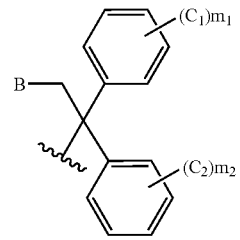

(I-1)

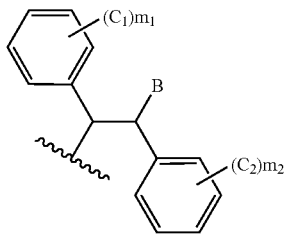

(I-2)

wherein:

B, $C_1$, and $C_2$ each independently represents a polymer;

$m_1$ and $m_2$ each independently represents an integer of 1 or 2, wherein when $m_1$ or $m_2$ is 2, both $C_1$ or both $C_2$ represent the same group or different groups; and wavy lined parts indicate a binding part to the structure represented by formula (VIII-1), (VIII-2), (IX-1), or (IX-2).

2. The star polymer according to claim 1, wherein the ratio (Mw/Mn) of the weight average molecular weight (Mw) to the number average molecular weight (Mn) is from 1.01 to 1.20.

* * * * *